United States Patent
Li (10) Patent No.: US 9,953,262 B2
(45) Date of Patent: Apr. 24, 2018

(54) APPLICATION RECOMMENDING METHOD AND APPARATUS

(71) Applicant: TENCENT TECHNOLOGY (SHENZHEN) COMPANY LIMITED, Shenzhen, Guangdong (CN)

(72) Inventor: Bing Li, Shenzhen (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 137 days.

(21) Appl. No.: 15/172,280

(22) Filed: Jun. 3, 2016

(65) Prior Publication Data

US 2016/0283843 A1 Sep. 29, 2016

Related U.S. Application Data

(63) Continuation of application No. PCT/CN2015/075242, filed on Mar. 27, 2015.

(30) Foreign Application Priority Data

Mar. 28, 2014 (CN) .......................... 2014 1 0122880

(51) Int. Cl.
*G06F 15/173* (2006.01)
*G06N 5/02* (2006.01)
(Continued)

(52) U.S. Cl.
CPC ......... *G06N 5/02* (2013.01); *G06F 17/30867* (2013.01); *G06Q 30/0224* (2013.01); *G06Q 30/0255* (2013.01); *H04L 47/70* (2013.01)

(58) Field of Classification Search
CPC ............... G06Q 30/0631; G06Q 30/02; G06Q 30/0201; G06Q 30/0254; G06Q 30/0224;
(Continued)

(56) References Cited

U.S. PATENT DOCUMENTS

| 7,827,186 | B2 | 11/2010 | Hicks | |
| 8,468,115 | B2 | 6/2013 | Gartenberg | |
| 8,843,484 | B2 * | 9/2014 | Gu | G06F 17/30029 707/734 |
| 2012/0131183 | A1 * | 5/2012 | Heidt | H04L 67/22 709/224 |
| 2012/0143677 | A1 * | 6/2012 | Bruno | G06Q 30/0247 705/14.46 |
| 2013/0031173 | A1 | 1/2013 | Deng | |

(Continued)

FOREIGN PATENT DOCUMENTS

| CN | 101105795 A | 1/2008 |
| CN | 102195886 A | 9/2011 |

(Continued)

OTHER PUBLICATIONS

International Search Report for App. No. PCT/CN2015/075242 dated Jul. 1, 2015.
International Preliminary Report for App. No. PCT/CN2015/075242 dated Oct. 4, 2016.

*Primary Examiner* — Dustin Nguyen
*Assistant Examiner* — Hao Nguyen
(74) *Attorney, Agent, or Firm* — Harness, Dickey & Pierce, P.L.C.

(57) ABSTRACT

An application recommending method includes acquiring a first behavior eigenvalue according to behavior data of a first user. It is determined that at least one second user from a user relationship chain of the first user according to the first behavior eigenvalue. The second user is on the user relationship chain of the first user. A degree of similarity between a second behavior eigenvalue and the first behavior eigenvalue is greater than a preset threshold, and the second behavior eigenvalue is a behavior eigenvalue of the second user. A to-be-recommended application for the first user on the basis of behavior data of the at least one second user is determined.

16 Claims, 2 Drawing Sheets

(51) Int. Cl.
*G06Q 30/02* (2012.01)
*G06F 17/30* (2006.01)
*H04L 12/911* (2013.01)

(58) Field of Classification Search
CPC ......... G06Q 30/0255; G06Q 10/06315; G06Q 30/0242; G06Q 50/01; G06Q 30/0247; G06Q 30/0251; G06Q 30/0256; G06Q 30/0269; G06Q 30/0282; H04L 67/32; H04L 67/306; H04L 47/70; H04L 67/22; H04L 67/02; G06F 9/505; G06F 11/3438; G06F 17/3097
USPC ............... 709/204, 205, 217, 219, 224, 226; 705/14.46, 14.49, 14.53, 14.54, 26.7
See application file for complete search history.

(56) References Cited

U.S. PATENT DOCUMENTS

| | | | |
|---|---|---|---|
| 2013/0282519 A1* | 10/2013 | Xavier | G06Q 30/0631 705/26.7 |
| 2013/0339450 A1* | 12/2013 | Flinn | G06F 17/30699 709/204 |
| 2016/0162551 A1* | 6/2016 | Liu | G06F 9/44 707/748 |

FOREIGN PATENT DOCUMENTS

| | | |
|---|---|---|
| CN | 102317941 A | 1/2012 |
| CN | 102411596 A | 4/2012 |
| CN | 103020055 A | 4/2013 |

* cited by examiner

APPLICATION RECOMMENDING METHOD AND APPARATUS

CROSS-REFERENCE TO RELATED APPLICATIONS

This application is a continuation of International Application No. PCT/CN2015/075242, filed Mar. 27, 2015. This application claims the benefit and priority of Chinese Application No. 201410122880.X, filed Mar. 28, 2014. The entire disclosures of each of the above applications are incorporated herein by reference.

FIELD

The present disclosure relates to the field of Internet technologies and to an application recommending method and apparatus.

BACKGROUND

This section provides background information related to the present disclosure which is not necessarily prior art.

In the Internet environment, after a user logs on to a web social platform such as Weibo, if a server of the web social platform can recommend applications that the user is interested in, it not only enhances user experience, but also improves the access and click-through rate of the application.

The existing technology mainly uses two application recommending methods. The first method recommends applications on the basis of an interest category of a user and category attributes of applications, that is, an interest category of a user is determined according to behavior data (such as a historical access record) of the user, and then, a degree of similarity between the interest category of the user and each optional application to be recommended is calculated, so as to determine a to-be-recommended application according to the degree of similarity. The second method recommends applications on the basis of users having similar interests, that is, an interest of a user is analyzed first, then, according to a k-nearest neighbor algorithm or Support Vector Machine (SVM), users having interests similar to that of the user are searched for in all registered users on the website, and applications visited or downloaded by these users having similar interests are considered comprehensively, to determine a to-be-recommended application.

The existing technology at least has the following challenge. Both the application recommending methods described above only recommend applications roughly according to interests of users, and therefore, have a defect of low recommendation accuracy.

SUMMARY

This section provides a general summary of the disclosure, and is not a comprehensive disclosure of its full scope or all of its features.

In response to the challenges in the existing technology, various embodiments provide an application recommending method and apparatus. The technical methods are as follow.

According to one aspect, an application recommending method is provided, the method includes:

acquiring a first behavior eigenvalue according to behavior data of a first user;

determining at least one second user from a user relationship chain of the first user according to the first behavior eigenvalue, the second user being on the user relationship chain of the first user, a degree of similarity between a second behavior eigenvalue and the first behavior eigenvalue being greater than a preset threshold, and the second behavior eigenvalue being a behavior eigenvalue of the second user; and determining a to-be-recommended application for the first user on the basis of behavior data of the at least one second user.

According to another aspect, an application recommending apparatus is provided, the apparatus includes:

a behavior eigenvalue acquiring module, configured to acquire a first behavior eigenvalue according to behavior data of a first user;

a second user determining module, configured to determine at least one second user from a user relationship chain of the first user according to the first behavior eigenvalue, the second user being on the user relationship chain of the first user, a degree of similarity between a second behavior eigenvalue and the first behavior eigenvalue being greater than a preset threshold, and the second behavior eigenvalue being a behavior eigenvalue of the second user; and an application determining module, configured to determine a to-be-recommended application for the first user on the basis of behavior data of the at least one second user.

Various embodiments produce the following beneficial effects.

After a first behavior eigenvalue is acquired according to behavior data of a first user, at least one second user is determined from a user relationship chain, a degree of similarity between a behavior eigenvalue of the second user and the first behavior eigenvalue being greater than a preset threshold. Further, a to-be-recommended application for the first user is determined on the basis of behavior data of the at least one second user. Because behavior eigenvalues can be used to summarize behavior data of users and accurately represent the behavior data in a numerical form, the behavior eigenvalues can express interests of the users accurately, so that interests, which are determined on the basis of the behavior eigenvalues, of the second user and the first user are more similar. Therefore, a to-be-recommended application can be accurately determined on the basis of the behavior data of the at least one second user, and the recommendation is highly accurate.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

To illustrate the various embodiments more clearly, the following briefly introduces the accompanying drawings to describe the embodiments of the present disclosure. The accompanying drawings in the following description show merely some embodiments, and one with ordinary skill in the art may still derive other drawings from these accompanying drawings without creative efforts.

Corresponding reference numerals indicate corresponding parts throughout the several views of the drawings.

DETAILED DESCRIPTION

Example embodiments will now be described more fully with reference to the accompanying drawings.

The implementation manners of the present disclosure will be described in more detail below with reference to the accompanying drawings.

Before detailed description of the embodiments of the present disclosure, an example of application scenario is first explained. A typical application scenario of the embodiments is as follows. After a user registers and logs on to a web social platform, a server of the web social platform may recommend applications to the user, so as to enhance interest and the user experience. When recommending applications, in order to improve the accuracy of recommendation, the server does not recommend applications to the user randomly; instead, the server recommends applications on the basis of behavior data and a user relationship chain of the user. An example of this process is as follows. The server acquires a first behavior eigenvalue according to behavior data of a first user. The server then determines at least one second user from a user relationship chain of the first user according to the first behavior eigenvalue, a degree of similarity between a second behavior eigenvalue and the first behavior eigenvalue being greater than a preset threshold, and the second behavior eigenvalue being a behavior eigenvalue of the second user; and then determines a to-be-recommended application for the first user on the basis of behavior data of the at least one second user.

For a web social platform such as Weibo, each user has a long user relationship chain, which is a weak relationship chain. The weak relationship chain refers to a relationship chain in which the user has a low degree of intimacy with each user in the user relationship chain thereof. In other words, the weak relationship chain usually does not include users having an intimate relationship with the other user, such as relatives, friends, schoolmates, and colleagues, also including many strangers, where the user and the strangers in the relationship chain rarely follow each other or comment each other. Because applications are recommended on the basis of the weak relationship chain, and behavior data of the user generally includes massive data such as real-time behavior data and historical behavior data, the application recommendation needs a large amount of computation and has poor real-time performance. Therefore, in the case in which the user relationship chain is a weak relationship chain, the various embodiments use a distributed computing method shown in FIG. 1 to speed up the application recommendation.

Figure 1:
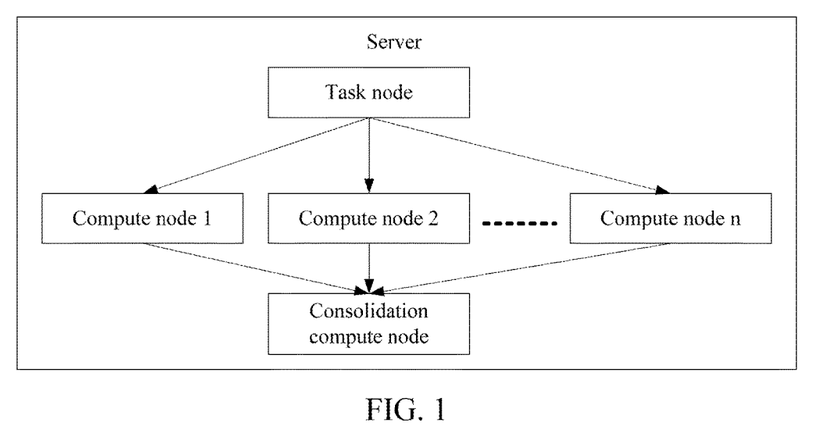
FIG. 1 is a composition diagram of an application recommending server according to various embodiments of the present disclosure.

In FIG. 1, a server includes a task node, multiple compute (map) nodes, and a consolidation (reduce) node. The task node is responsible for distributing application recommending tasks, and the task node assigns compute nodes to an application recommending task according to a load condition of each compute node. For an application recommending task, if the user has an excessively large amount of behavior data or the user relationship chain of the user is excessively long, to speed up the application recommendation, the task node may further divide one application recommending task into multiple sub-tasks when distributing the application recommending task. The multiple sub-tasks are distributed to multiple compute nodes, to obtain computation results, and the computation results are sent to the consolidation node. The consolidation node consolidates the compute results sent by all the compute nodes, to obtain a final computation result. For example, when the behavior eigenvalue is computed according to massive behavior data, the behavior data may be assigned to multiple compute nodes, and the multiple compute nodes computes the behavior eigenvalue according to the distributed behavior data. After, the consolidation node consolidates the computation results of multiple compute nodes to obtain the behavior eigenvalue of the user.

Figure 2:
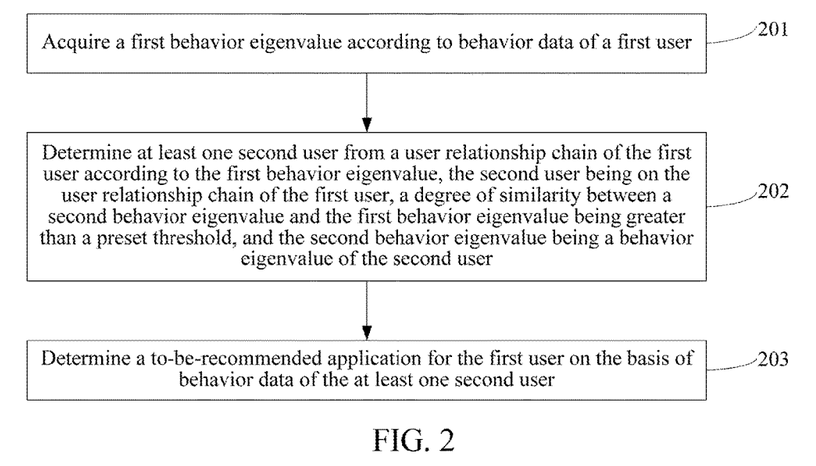
FIG. 2 is a flowchart of an application recommending method according to various embodiments.

FIG. 2 is a flowchart of an application recommending method according to various embodiments. In FIG. 2, a process of the method includes the following.

Block 201: Acquire a first behavior eigenvalue according to behavior data of a first user.

Block 202: Determine at least one second user from a user relationship chain of the first user according to the first behavior eigenvalue, the second user being on the user relationship chain of the first user, a degree of similarity between a second behavior eigenvalue and the first behavior eigenvalue being greater than a preset threshold, and the second behavior eigenvalue being a behavior eigenvalue of the second user.

Block 203: Determine a to-be-recommended application for the first user on the basis of behavior data of the at least one second user.

In the method provided by the various embodiments, after a first behavior eigenvalue is acquired according to behavior data of a first user, at least one second user is determined from a user relationship chain, a degree of similarity between a behavior eigenvalue of the second user and the first behavior eigenvalue being greater than a preset threshold. Further, a to-be-recommended application for the first user is determined on the basis of behavior data of the at least one second user. Because behavior eigenvalues can be used to summarize behavior data of users and accurately represent the behavior data in a numerical form, the behavior eigenvalues can express interests of the users accurately, so that interests, which are determined on the basis of the behavior eigenvalues, of the second user and the first user are more similar. Therefore, a to-be-recommended application can be accurately determined on the basis of the behavior data of the at least one second user, and the recommendation is highly accurate.

Acquiring a first behavior eigenvalue according to behavior data of a first user includes:

acquiring a real-time behavior eigenvalue according to real-time behavior data of the first user;

acquiring a historical behavior eigenvalue according to historical behavior data of the first user; and acquiring the first behavior eigenvalue of the first user according to the real-time behavior eigenvalue and the historical behavior eigenvalue.

The method further includes determining, on the basis of a current user relationship chain and a historical user relationship chain of the first user, a user deleted from the historical user relationship chain with respect to the current user relationship chain, and determining a deleted user as the second user if a degree of similarity between a behavior eigenvalue of the deleted user and the first behavior eigenvalue is greater than the preset threshold.

Acquiring a first behavior eigenvalue according to behavior data of a first user includes:

acquiring an eigenvalue of each piece of behavior data of the first user; and computing the first behavior eigenvalue according to the eigenvalue of each piece of behavior data and a preset weight value of each piece of behavior data.

In various embodiments, before acquiring a first behavior eigenvalue according to behavior data of a first user, the method further includes:

acquiring a scheduling weight of each compute node; and scheduling, according to the scheduling weight of each compute node, at least one compute node of multiple compute nodes to execute the procedure of acquiring a first behavior eigenvalue according to behavior data of a first user.

In various embodiments, acquiring a scheduling weight of each compute node includes:

acquiring, for one compute node of the multiple compute nodes, a computation delay of the compute node and a resource utilization of the compute node;

computing a system load of the compute node according to the computation delay and the resource utilization; and acquiring the scheduling weight of the compute node according to the system load of the compute node and system loads of other compute nodes.

In various embodiments, the following formula computes the system load of the compute node according to the computation delay and the resource utilization:

$$Z_i = Ri*0.8*\alpha + 0.2/Ti*\beta$$

where $Z_i$ denotes a system load of the $i^{th}$ compute node, Ri denotes a resource utilization of the $i^{th}$ compute node, Ti denotes a computation delay of the $i^{th}$ compute node, and $\alpha$ and $\beta$ are both constants.

In various embodiments, the following formula acquires the scheduling weight of the compute node according to the system load of the compute node and system loads of other compute nodes:

$$w_i = (1/Z_i)/(1/Z_1 + 1/Z_2 + \ldots + 1/Z_n)$$

where $w_i$ denotes a scheduling weight of the $i^{th}$ compute node, $Z_1$ denotes a system load of the first compute node, $Z_2$ denotes a system load of the second compute node, and $Z_n$ denotes a system load of the $n^{th}$ compute node.

In various embodiments, the method further includes scheduling, when it is detected that an exception occurs in a compute node currently executing an application recommending task, a backup compute node of the compute node to execute the application recommending task.

All the above technical methods may be combined randomly to form various embodiments, which are not described in detail herein.

Figure 3:
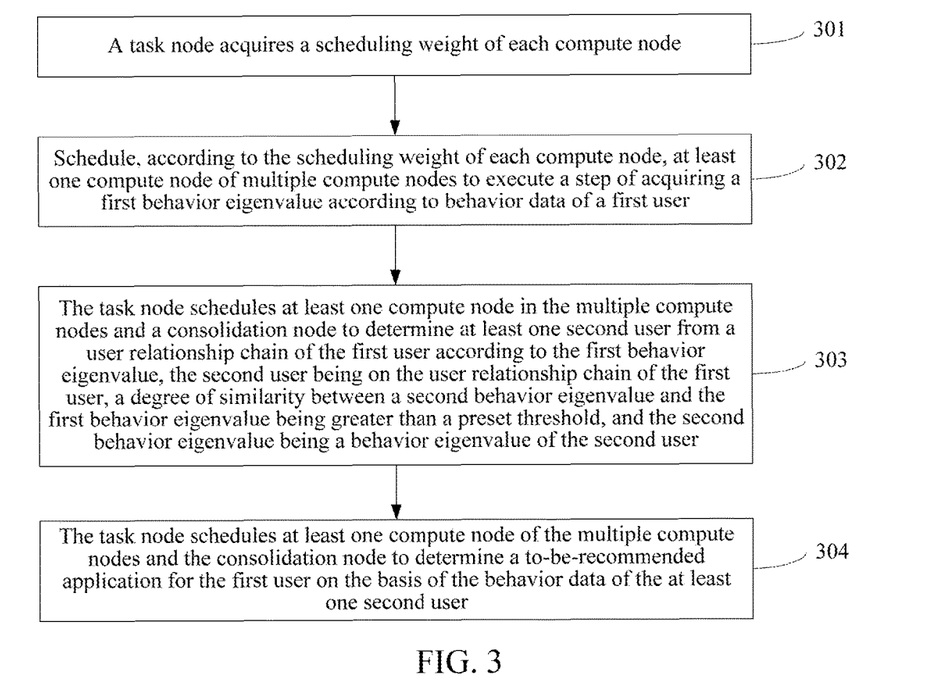
FIG. 3 is a flowchart of an application recommending method according to various embodiments.

FIG. 3 is a flowchart of an application recommending method according to various embodiments. In the embodiment shown in FIG. 3, the eigenvalue of behavior data being a hash value is used as an example to describe the application recommending manner provided by this embodiment of the present disclosure in detail. In FIG. 3, a process of the method provided by this embodiment includes:

Block 301: A task node acquires a scheduling weight of each compute node.

According to various embodiments, in order to ensure the load balance of the compute nodes and speed up the application recommendation, the task node needs to distribute an application recommending task according to a load condition of each compute node. The scheduling weight can reflect the load condition of each compute node, and therefore, when distributing the application recommending task, the task node further needs to acquire the scheduling weight of each compute node first.

The task node may use the following method to acquire the scheduling weight of each compute node. For one compute node in the multiple compute nodes, acquiring a computation delay of the compute node and a resource utilization of the compute node, computing a system load of the compute node according to the computation delay and the resource utilization, and acquiring the scheduling weight of the compute node according to the system load of the compute node and system loads of other compute nodes.

The resource utilization refers to at least one of a central processing unit (CPU), a memory utilization, and an input/output (I/O) utilization. In addition, because the computation delay and resource utilization of each compute node may change at any time, the computation delay and resource utilization of each compute node may be acquired by using the following method. The task node monitors each compute node immediately and collects statistics about the computation delay and resource utilization of each compute node, or each compute node reports, when the computation delay or resource utilization changes, a changed computation delay or a changed resource utilization immediately. This embodiment does not limit the method used. Regardless of which method is used, the task node can quickly acquire the computation delay and resource utilization of each compute node, thereby computing the scheduling weight of each compute node according to the computation delay and resource utilization of each compute node.

In various embodiments, the following formula may be used to compute the system load of the compute node according to the computation delay and the resource utilization:

$$Z_i = Ri*0.8*\alpha + 0.2/Ti*\beta \qquad (1)$$

$Z_i$ denotes a system load of the $i^{th}$ compute node; $Ri = r_i/r$, denoting a resource utilization of the $i^{th}$ compute node, $r_i$ is a resource currently used by the $i^{th}$ compute node, and r is all available resources of the $i^{th}$ compute node; $Ti = t_i/t$, denoting a computation delay of the $i^{th}$ compute node; and $\alpha$ and $\beta$ are both constants.

In various embodiments, system loads of all compute nodes can be computed according to the foregoing formula (1). After obtaining the system loads of all the compute nodes, the scheduling weight of each compute node can be acquired according to the system loads of all the compute nodes. The following formula may be used to acquire the scheduling weight of any compute node according to the system load of the compute node and the system loads of other compute nodes except said compute node:

$$w_i = (1/Z_i)/(1/Z_1 + 1/Z_2 + \ldots + 1/Z_n) \qquad (2)$$

where $w_i$ denotes a scheduling weight of the $i^{th}$ compute node, $Z_1$ denotes a system load of the first compute node, $Z_2$ denotes a system load of the second compute node, and $Z_n$ denotes a system load of the $n^{th}$ compute node.

Block 302: Schedule, according to the scheduling weight of each compute node, at least one compute node of multiple compute nodes to execute the procedure of acquiring a first behavior eigenvalue according to behavior data of a first user.

According to various embodiments, after obtaining the scheduling weight of each compute node, the task node may sort the scheduling weights in a descending order, and select one or more compute nodes having top scheduling weights among the multiple compute nodes as one or more compute nodes for a current application recommending task. After the compute node for the current application recommending task is determined, the compute node for the current application recommending task starts corresponding computation.

The following method may be used to acquire the first behavior eigenvalue according to the behavior data of the first user. Acquiring a real-time behavior eigenvalue according to real-time behavior data of the first user, acquiring a historical behavior eigenvalue according to historical behavior data of the first user, and acquiring the first behavior eigenvalue of the first user according to the real-time behavior eigenvalue and the historical behavior eigenvalue.

The behavior data may include data about a browsing behavior, data about a collecting behavior, data about a follow behavior, data about a comment behavior, data about a purchase behavior, and the like, and the embodiments do not limit the content of the behavior data. In various embodiments, the real-time behavior data refers to behavior data within a current period of time. For example, behavior data generated during a process of recommending an application to the user or generated several hours or a couple of days before the process of recommending an application to the user is triggered, or behavior data generated on the same day when an application is recommended to the user. A period of time during which the real-time behavior data is generated depends on an actual situation, and is not limited in the embodiments. The historical behavior data refers to all other behavior data of the user except the real-time behavior data. In the various embodiments, the behavior data is classified into the historical behavior data and the real-time behavior data so that the to-be-recommended application for the first user is more accurately determined. In the existing technologies, such as content recommendation technology and collaborative technology, applications are generally recommended on the basis of historical behavior data (historical access records) of the user. However, interests of the user may change at any time. Therefore, application recommendation merely based on data about historical access behaviors of the user may cause low recommendation accuracy at times, leading to poor user experience. Therefore, in the embodiments, applications are recommended on the basis of the real-time behavior data and the historical behavior data of the user.

Further, both the real-time behavior eigenvalue of the real-time behavior data and the historical behavior eigenvalue of the historical behavior data are acquired by using the following fingerprint algorithm. An example process is as follows. First block: Set an f-dimension vector V and an f-bit binary number S, and initialize the f-dimension vector V to be 0, and initialize the f-bit binary number S to be 0.

The f-dimension vector V takes the form of V=[$v_1$, $v_2$, $v_3$, . . . $v_f$], and it is an intermediate variable for computing the behavior eigenvalue, and the behavior eigenvalue is obtained on the basis of the f-dimension vector V. The binary number S refers to the behavior eigenvalue. The number of dimensions of the vector V and the number of bits of the binary number S are both limited by the number of bits of a hash value of each piece of subsequent behavior data. In other words, the number of dimensions of the vector V and the number of bits of the binary number S are the same as the number of bits of the hash value of each piece of behavior data.

Second block: Generate an f-bit eigenvalue b for each piece of behavior data by using a traditional hash algorithm. Regardless of whether each piece of behavior data represents a browsing behavior, a collecting behavior, or a comment behavior of the user, it is essentially a character string for a machine. A hash value of a character string can be computed quickly by using traditional hash algorithm code. Because there is a mature hash algorithm to implement the process of computing a hash value of characters, this process is not described in detail herein, and reference may be made to the existing hash algorithm.

Third block: Add a weight of the behavior data to the $i^{th}$ element of V if the $i^{th}$ bit of b is 1, or deduct the weight of the behavior data from the $i^{th}$ element of V if the $i^{th}$ bit of b is not 1, where i=1 to f. In this block, different behavior data may belong to different types, and when weights of the behavior data are set, weights of different types of behavior data are generally set to different values. The weight of the behavior data may be set according to a principle of whether the behavior data can reflect interests of the user. For example, the user definitely has a higher degree of interest in applications corresponding to the data about a collecting behavior than in applications corresponding to the data about a browsing behavior.

For the data regarding a collecting behavior and the data regarding a browsing behavior, because the data regarding a collecting behavior can reflect that the user sets a corresponding application as a favorite, the user generally likes the application very much; however, the data regarding a browsing behavior can only reflect that the user browses a corresponding application, and it is unknown whether the user likes the application or not. Therefore, when weights of the behavior data are set, the weight of the data regarding a collecting behavior is greater than the weight of the data regarding a browsing behavior. Regardless of how many types of behavior data there are, the weight of each type of behavior data can be set on the basis of the foregoing principle, and it is ensured that each type of behavior data corresponds to one weight.

For each piece of real-time behavior data, a vector V1 corresponding to the real-time behavior data can be obtained by performing the second block and third block repeatedly. For each piece of historical behavior data, a vector V2 corresponding to the historical behavior data can be obtained by performing the second block and third block repeatedly. After the vector V1 is obtained, a behavior eigenvalue S1 of the real-time behavior data can be obtained according to the vector V1. After the vector V2 is obtained, a behavior eigenvalue S2 of the historical behavior data can be obtained according to the vector V2. For details on the process, refer to the following fourth block.

Fourth block: The $i^{th}$ bit of S is 1 if the $i^{th}$ element of V is greater than 0, or the $i^{th}$ bit of S is 0 if the $i^{th}$ element of V is not greater than 0; and output S as the behavior eigenvalue. In this block, the value of each bit of the binary number S is determined according to the value of the corresponding bit of the vector V. Starting from i=1, when the computation proceeds to i=f, the behavior eigenvalue is obtained. In addition, with respect to the fingerprint algorithm provided by the various embodiments, when the eigenvalue b includes more bits, the to-be-recommended application determined in a subsequent process according to the computed behavior eigenvalue is more accurate. Therefore, in order to improve the accuracy, a large number of bits are set in the eigenvalue b. The number of bits in the eigenvalue b is set according to an actual situation.

In addition, in this embodiment, one user corresponds to one behavior eigenvalue. During computation according to the foregoing fingerprint algorithm, we separately obtain the real-time behavior eigenvalue S1 corresponding to the real-time behavior data of the user and the historical behavior eigenvalue S2 corresponding to the historical behavior data of the user, and therefore, the first behavior eigenvalue of the user further needs to be acquired in a weighted manner. When weights of the real-time behavior eigenvalue S1 and the historical behavior eigenvalue S2 are set, because the real-time behavior eigenvalue can better reflect the current interest of the user, the weight of the real-time behavior eigenvalue is greater than the weight of the historical behavior eigenvalue. For example, the weight of the real-time behavior eigenvalue is set to 0.6, and the weight of the historical behavior data is set to 0.4.

Block 303: The task node schedules at least one compute node in the multiple compute nodes and a consolidation node to determine at least one second user from a user relationship chain of the first user according to the first behavior eigenvalue, the second user being on the user relationship chain of the first user, a degree of similarity between a second behavior eigenvalue and the first behavior eigenvalue being greater than a preset threshold, and the second behavior eigenvalue being a behavior eigenvalue of the second user.

In the various embodiments, after the first behavior eigenvalue of the first user is obtained according to block 302, noise in the user relationship chain of the first user can be reduced according to the first behavior eigenvalue. In other words, in the user relationship chain, users unrelated to the interest of the first user are removed. When noise in the user relationship chain is reduced, the behavior eigenvalue of each user in the user relationship chain further needs to be computed according to the method shown in block 302 Because the user relationship chain may include massive users, in order to reduce time spent in computation, when computing the behavior eigenvalue of each user in the user relationship chain, the task node may assign multiple compute nodes to compute the behavior eigenvalue of the user in the user relationship chain, and the consolidation node then consolidates and collects computation results of the multiple compute nodes.

After the behavior eigenvalue of each user in the user relationship chain is obtained, noise in the user relationship chain can be reduced. The noise reduction process uses the method of determining whether a degree of similarity between the first behavior eigenvalue and the behavior eigenvalue of each user on the user relationship chain is greater than a preset threshold. During determining, because the first behavior eigenvalue and the behavior eigenvalue of each user on the user relationship chain are both f-bit binary numbers, the degree of similarity there between may be computed by comparing the two behavior eigenvalues to determine a percentage of identical data bits or a percentage of different data bits in the two behavior eigenvalues. For example, if values of all data bits of the two behavior eigenvalues are the same, the degree of similarity between the behavior eigenvalues is 100%. If none of values of the data bits of the two behavior eigenvalues is the same, the degree of similarity between the behavior eigenvalues is 0. The value of the preset threshold may be 90%. Apart from the foregoing value, the preset threshold may also be other values, such as 95% or 96%, and this embodiment does not limit the value of the preset threshold.

Further, the user relationship chain of the first user may change. For example, new users are added to the user relationship chain, or some original users are deleted. Therefore, when the second user is determined from the user relationship chain of the first user, at least one second user needs to be determined further according to a current user relationship chain and a historical user relationship chain of the first use, because the following situation exists. Some users in the historical user relationship chain of the first user have interests similar to that of the first user and also have an intimate relationship with the first user. However, for various reasons, the first user may delete from the relationship chain the users who have interests similar to that of the first user, and therefore, the users with interests similar to that of the first user do not appear in the current relationship chain. However, the behavior data of these users plays a key role in determining the to-be-recommended application for the first user, and therefore, users deleted from the historical user relationship chain with respect to the current user relationship chain further need to be determined. A deleted user is determined as the second user if a degree of similarity between the behavior eigenvalue of the deleted user and the first behavior eigenvalue is greater than the preset threshold. For a new user in the user relationship chain, because the new user appears in the current relationship chain, during determining the second user, the new user is naturally used as an optional user.

The user relationship chain of the first user may further include a celebrity user, and the celebrity user generally is not removed during noise reduction of the user relationship chain of the user because the celebrity user has powerful influence. A celebrity user is followed by a lot of people, which may be tens thousands of, millions of, or even tens of millions of people, and therefore, the celebrity user is generally a very important person (VIP) user. The VIP user is distinguished from common users by using a corresponding identifier, and therefore, the celebrity user can be extracted according to the identifier.

Because the noise in the user relationship chain of the first user is reduced by performing the procedure, to remove users unrelated to the interest of the user, the accuracy of recommendation is improved when determining the to-be-recommended application for the first user. In addition, various embodiments recommend applications on the basis of the user relationship chain, and therefore, the amount of computation is significantly reduced as compared with the application recommendation on the basis of all registered users on the website. Moreover, because a lot of users unrelated to the interest of the first user are removed, the amount of computation can further be reduced when the to-be-recommended application for the first user is determined subsequently.

Block 304: The task node schedules at least one compute node of the multiple compute nodes and the consolidation node to determine a to-be-recommended application for the first user on the basis of the behavior data of the at least one second user.

According to various embodiments, the following two methods may be used to determine the to-be-recommended application for the first user on the basis of the behavior data of the at least one second user:

First method: Summarize the behavior data of the least one second user and determine all applications corresponding to the behavior data of the at least one second user. Then, determine hot applications among all the applications and determine the hottest one or several applications as one or several to-be-recommended applications for the first user.

Second method: Summarize the behavior data of the least one second user, and determine all interest categories of the at least one second user. Then, among all the interest categories, determine the most favorite one or several applications as one or several to-be-recommended applications for the first user. Select one or several applications from each category of to-be-recommended applications randomly or according to a given rule, and use the selected application as the to-be-recommended application for the first user.

This embodiment does not limit which of the foregoing application recommending manners is used. In addition, the application recommending manner provided by this embodiment can not only significantly improve the accuracy of application recommendation but also reduce the amount of computation. Compared with the existing technology in which an interest category is determined according to behavior data of a first user and applications are then recommended according to the interest category of the first user and category attributes of applications, this embodiment recommends applications on the basis of the behavior data of the first user and behavior data of at least one second user having interests similar to that of the first user, thereby expanding the sample size and obtaining a more accurate recommendation result. Compared with the second existing technology in which applications are recommended on the basis of users having similar interests, this embodiment does not need to search massive registered users on the website, and can significantly reduce the amount of computation because noise in a user relationship chain is reduced. Moreover, at least one second user is determined on the basis of behavior eigenvalues, and therefore, the manner of determining the second user is more accurate and a to-be-recommended application is determined on the basis of accurate users, which contributes to higher accuracy of application recommendation.

When the task node calls at least one compute node of the multiple compute nodes to execute block 302 to block 304, if an exception occurs in a currently operating compute node, and the currently operating compute node can no longer operate normally, the various embodiments provide a disaster recovery processing manner for computation. That is, a backup compute node is separately set for each compute node. When an exception occurs in a compute node, which is generally referred to as a primary compute node, computation is performed by the backup compute node thereof. When the primary compute node operates normally, the backup compute node is not started. In addition, computation resources needed by each compute node are pre-loaded. In other words, to prevent the backup compute node from spending time acquiring computation resources from a storage device to perform computation when an exception occurs in the primary compute node, the computation resources needed by the compute node are acquired from the storage device in advance. When an exception occurs in the primary compute node, the backup compute node starts computation in a short amount of time according to the computation resources stored in the backup compute node.

In the method provided by the various embodiments, after a first behavior eigenvalue is acquired according to behavior data of a first user, at least one second user is determined from a user relationship chain, a degree of similarity between a behavior eigenvalue of the second user and the first behavior eigenvalue being greater than a preset threshold. Further, a to-be-recommended application for the first user is determined on the basis of behavior data of the at least one second user. Because behavior eigenvalues can be used to summarize behavior data of users and accurately represent the behavior data in a numerical form, the behavior eigenvalues can express interests of the users accurately, so that interests, which are determined on the basis of the behavior eigenvalues, of the second user and the first user are more similar. Therefore, a to-be-recommended application can be accurately determined on the basis of the behavior data of the at least one second user, and the recommendation is highly accurate. In addition, determining the to-be-recommended application for the first user on the basis of the de-noised user relationship chain can significantly reduce the amount of computation, thereby reducing time spent on computation and achieving desirable real-time performance.

Figure 4:
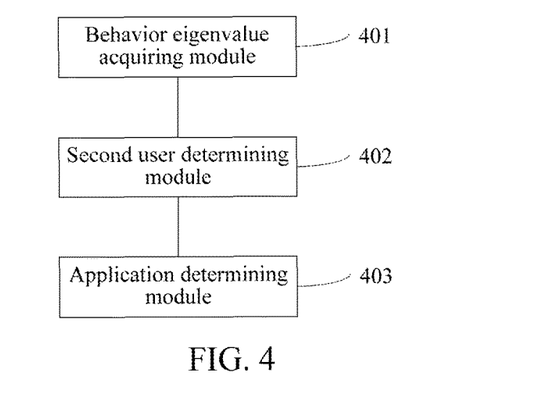
FIG. 4 is a structural diagram of an application recommending apparatus according to various embodiments.

FIG. 4 shows an application recommending apparatus according to various embodiments of the present disclosure. In FIG. 4, the apparatus includes a behavior eigenvalue acquiring module 401, a second user determining module 402, and an application determining module 403.

The behavior eigenvalue acquiring module 401 is configured to acquire a first behavior eigenvalue according to behavior data of a first user. The second user determining module 402 is connected to the behavior eigenvalue acquiring module 401, and is configured to determine at least one second user from a user relationship chain of the first user according to the first behavior eigenvalue, the second user being on the user relationship chain of the first user, a degree of similarity between a second behavior eigenvalue and the first behavior eigenvalue being greater than a preset threshold, and the second behavior eigenvalue being a behavior eigenvalue of the second user; and the application determining module 403 is connected to the second user determining module 402, and is configured to determine a to-be-recommended application for the first user on the basis of the behavior data of the at least one second user.

In various embodiments, the behavior eigenvalue acquiring module is configured to acquire real-time behavior eigenvalue according to real-time behavior data of the first user, acquire a historical behavior eigenvalue according to historical behavior data of the first user, and acquire the first behavior eigenvalue of the first user according to the real-time behavior eigenvalue and the historical behavior eigenvalue.

In various embodiments, the second user determining module is further configured to determine, on the basis of a current user relationship chain and a historical user relationship chain of the first user, a user deleted from the historical user relationship chain with respect to the current user relationship chain, and determine a deleted user as the second user if a degree of similarity between a behavior eigenvalue of the deleted user and the first behavior eigenvalue is greater than the preset threshold.

In various embodiments, the behavior eigenvalue acquiring module is configured to acquire an eigenvalue of each piece of behavior data of the first user and compute the first behavior eigenvalue according to the eigenvalue of each piece of behavior data and a preset weight value of each piece of behavior data.

In various embodiments, the apparatus further includes:
a scheduling weight acquiring module, configured to acquire a scheduling weight of each compute node; and
a scheduling module, configured to schedule, according to the scheduling weight of each compute node, at least one compute node of multiple compute nodes to execute the procedure of acquiring a first behavior eigenvalue according to behavior data of a first user.

In various embodiments, the scheduling weight acquiring module is configured to acquire, for one compute node in the multiple compute nodes, a computation delay of the compute node and a resource utilization of the compute node, compute a system load of the compute node according to the computation delay and the resource utilization, and acquire the scheduling weight of the compute node according to the system load of the compute node and system loads of other compute nodes.

In various embodiments, the scheduling weight acquiring module may use the following formula to compute the system load of the compute node:

$$Z_i = Ri*0.8*\alpha + 0.2/Ti*\beta$$

where $Z_i$ denotes a system load of the $i^{th}$ compute node, Ri denotes a resource utilization of the $i^{th}$ compute node, Ti denotes a computation delay of the $i^{th}$ compute node, and $\alpha$ and $\beta$ are both constants.

In various embodiments, the scheduling weight acquiring module uses the following formula to compute the scheduling weight of the compute node:

$$w_i = (1/Z_i)/(1/Z_1 + 1/Z_2 + \ldots + 1/Z_n)$$

where $w_i$ denotes a scheduling weight of the $i^{th}$ compute node, $Z_1$ denotes a system load of the first compute node, $Z_2$ denotes a system load of the second compute node, and $Z_n$ denotes a system load of the $n^{th}$ compute node.

In various embodiments, the scheduling module is further configured to schedule, when it is detected that an exception occurs in a compute node currently executing an application recommending task, a backup compute node of the compute node to execute the application recommending task.

The apparatus provided by this embodiment determines at least one second user from a user relationship chain after acquiring a first behavior eigenvalue according to behavior data of a first user, a degree of similarity between a behavior eigenvalue of the second user and the first behavior eigenvalue being greater than a preset threshold, and further, determines a to-be-recommended application for the first user on the basis of behavior data of the at least one second user. Because behavior eigenvalues can be used to summarize behavior data of users and accurately represent the behavior data in a numerical form, the behavior eigenvalues can express interests of the users accurately, so that interests, which are determined on the basis of the behavior eigenvalues, of the second user and the first user are more similar. Therefore, a to-be-recommended application can be accurately determined on the basis of the behavior data of the at least one second user, and the recommendation is highly accurate.

It should be noted that, when the application recommending apparatus provided in the forgoing various embodiments recommend an application, division of the foregoing functional modules is merely an example for description. In actual application, the foregoing functions may be assigned to and completed by different modules as needed, that is, the internal structure of the apparatus is divided into different functional modules to implement all or some of the functions described above. In addition, the application recommending apparatus provided in the foregoing various embodiments belong to the same conception as the embodiment of the application recommending method. Refer to the method embodiment for details of the implementation process, which is not described herein again.

The sequence numbers of the foregoing embodiments of the present invention are merely for the convenience of description, and do not imply the preference among the embodiments.

One with ordinary skill in the art may understand that all or some of the procedures of the foregoing various embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the present invention, but are not intended to limit the present disclosure. Any modification, equivalent replacement, or improvement made within the spirit and principle of the present disclosure shall fall within the protection scope of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. An application recommending method, comprising:
acquiring a first behavior eigenvalue according to behavior data of a first user;
determining at least one second user from a user relationship chain of the first payment relationship chain of the first user, a degree of similarity between a second behavior eigenvalue and the first behavior eigenvalue being greater than a preset threshold, and the second behavior eigenvalue being a behavior eigenvalue of the second user;
determining a to-be-recommended application for the first user on a basis of behavior data of the at least one second user; and
acquiring a scheduling weight of each compute node before the acquiring a first behavior eigenvalue and computing a system load of the compute node,
wherein the system load of the compute node is determined in accordance with:

$$Z_i = Ri*0.8*\alpha + 0.2/Ti*\beta,$$

wherein $Z_i$ indicates a system load of an $i^{th}$ compute node, Ri indicates a resource utilization of the $i^{th}$ compute node, Ti indicates a computation delay of the $i^{th}$ compute node, and $\alpha$ and $\beta$ are both constants.

2. The method according to claim 1, wherein the acquiring a first behavior eigenvalue further comprises:
acquiring a real-time behavior eigenvalue according to real-time behavior data of the first user;
acquiring a historical behavior eigenvalue according to historical behavior data of the first user; and
acquiring the first behavior eigenvalue of the first user according to the real-time behavior eigenvalue and the historical behavior eigenvalue.

3. The method according to claim 1, wherein the method further comprises:

determining, on the basis of a current user relationship chain and a historical user relationship chain of the first user, a user deleted from the historical user relationship chain with respect to the current user relationship chain, and determining a deleted user as the second user if a degree of similarity between a behavior eigenvalue of the deleted user and the first behavior eigenvalue is greater than the preset threshold.

4. The method according to claim 1, wherein the acquiring a first behavior eigenvalue further comprises:
  acquiring an eigenvalue of each piece of behavior data of the first user; and
  computing the first behavior eigenvalue according to the eigenvalue of each piece of behavior data and a preset weight value of each piece of behavior data.

5. The method according to claim 1, wherein before the acquiring a first behavior eigenvalue according to behavior data of a first user, the method further comprises:
  scheduling, according to the scheduling weight of each compute node, at least one compute node of multiple compute nodes to acquire the first behavior eigenvalue.

6. The method according to claim 5, wherein the acquiring a scheduling comprises:
  acquiring, for one compute node of the multiple compute nodes, a computation delay of the compute node and a resource utilization of the compute node; and
  acquiring the scheduling weight of the compute node according to the system load of the compute node and system loads of other compute nodes.

7. The method according to claim 6, wherein the scheduling weight of the compute node is determined in accordance with:

$$w_i = (1/Z_i)/(1/Z_1 + 1/Z_2 + \ldots + 1/Z_n),$$

wherein $w_i$ denotes a scheduling weight of the $i^{th}$ compute node, $Z_1$ denotes a system load of a first compute node, $Z_2$ denotes a system load of a second compute node, and $Z_n$ denotes a system load of a $n^{th}$ compute node.

8. The method according to claim 4, further comprising:
  scheduling, when it is detected that an exception occurs in a compute node currently executing an application recommending task, a backup compute node of the compute node to execute the application recommending task.

9. An application recommending apparatus having a memory, comprising:
  a behavior eigenvalue acquiring module, configured to acquire a first behavior eigenvalue according to behavior data of a first user;
  a second user determining module, configured to determine at least one second user from a user relationship chain of the first user according to the first behavior eigenvalue, the second user being on the user relationship chain of the first user, a degree of similarity between a second behavior eigenvalue and the first behavior eigenvalue being greater than a preset threshold, and the second behavior eigenvalue being a behavior eigenvalue of the second user;
  a scheduling weight acquiring module, configured to acquire a scheduling weight of each compute node and compute a system load of the compute node according to a computation delay and a resource utilization, wherein the scheduling weight acquiring module determines the system load of the compute node in accordance with:

$$Z_i = Ri * 0.8 * \alpha + 0.2/Ti * \beta$$

wherein $Z_i$ denotes a system load of an $i^{th}$ compute node, Ri denotes a resource utilization of the $i^{th}$ compute node, Ti denotes a computation delay of the $i^{th}$ compute node, and $\alpha$ and $\beta$ are both constants; and
  an application determining module, configured to determine a to-be-recommended application for the first user on a basis of behavior data of the at least one second user.

10. The apparatus according to claim 9, wherein the behavior eigenvalue acquiring module is configured to acquire a real-time behavior eigenvalue according to real-time behavior data of the first user; acquire a historical behavior eigenvalue according to historical behavior data of the first user; and acquire the first behavior eigenvalue of the first user according to the real-time behavior eigenvalue and the historical behavior eigenvalue.

11. The apparatus according to claim 9, wherein the second user determining module is further configured to determine, on the basis of a current user relationship chain and a historical user relationship chain of the first user, a user deleted from the historical user relationship chain with respect to the current user relationship chain, and determine a deleted user as the second user if a degree of similarity between a behavior eigenvalue of the deleted user and the first behavior eigenvalue is greater than the preset threshold.

12. The apparatus according to claim 9, wherein the behavior eigenvalue acquiring module is configured to acquire an eigenvalue of each piece of behavior data of the first user; and compute the first behavior eigenvalue according to the eigenvalue of each piece of behavior data and a preset weight value of each piece of behavior data.

13. The apparatus according to claim 9, further comprising:
  a scheduling module, configured to schedule, according to the scheduling weight of each compute node, at least one compute node of multiple compute nodes to acquire the first behavior eigenvalue according to behavior data of a first user.

14. The apparatus according to claim 13, wherein the scheduling weight acquiring module is configured to acquire, for one compute node of the multiple compute nodes, a computation delay of the compute node and a resource utilization of the compute node; and acquire the scheduling weight of the compute node according to the system load of the compute node and system loads of other compute nodes.

15. The apparatus according to claim 14, wherein the scheduling weight acquiring module determines the scheduling weight of the compute node in accordance with:

$$w_i = (1/Z_i)/(1/Z_1 + 1/Z_2 + \ldots + 1/Z_n),$$

wherein $w_i$ denotes a scheduling weight of the $i^{th}$ compute node, $Z_1$ denotes a system load of a first compute node, $Z_2$ denotes a system load of a second compute node, and $Z_n$ denotes a system load of a $n^{th}$ compute node.

16. The apparatus according to claim 12, wherein the scheduling module is further configured to schedule, when it is detected that an exception occurs in a compute node currently executing an application recommending task, a backup compute node of the compute node to execute the application recommending task.

* * * * *